United States Patent [19]
Lewis et al.

[11] Patent Number: 5,346,789
[45] Date of Patent: Sep. 13, 1994

[54] ORIENTED BIOLOGICAL MATERIAL FOR OPTICAL INFORMATION STORAGE AND PROCESSING

[75] Inventors: Aaron Lewis, Jerusalem, Israel; Zhongping Chen, Syracuse, N.Y.; Hiroyuki Takei, Hatoyama, Japan

[73] Assignee: Cornell Research Foundation, Inc., Ithaca, N.Y.

[21] Appl. No.: 983,166

[22] Filed: Nov. 30, 1992

Related U.S. Application Data

[63] Continuation-in-part of Ser. No. 801,576, Dec. 6, 1991, abandoned.

[51] Int. Cl.⁵ ............................ G11B 7/00; G11B 7/26
[52] U.S. Cl. .................................... 430/19; 430/21; 430/139; 430/495; 430/945; 430/962; 430/321; 427/162
[58] Field of Search .................. 430/19, 346, 21, 962, 430/139, 945, 495, 321, 162

[56] References Cited

U.S. PATENT DOCUMENTS

| | | | |
|---|---|---|---|
| 4,356,256 | 10/1982 | O'Brien et al. | 430/332 |
| 4,659,429 | 9/1987 | Isaacson et al. | 422/49 |
| 4,880,496 | 11/1989 | Nebenzahl et al. | 156/643 |
| 4,917,462 | 4/1990 | Lewis et al. | 350/319 |
| 4,965,174 | 10/1990 | Arai et al. | 430/340 |
| 5,061,582 | 10/1991 | Brettle et al. | 430/19 |
| 5,107,104 | 4/1992 | Miyasaka | 250/211 R |
| 5,228,001 | 7/1993 | Birge et al. | 365/215 |

OTHER PUBLICATIONS

"Development of A 500 Å Spatial Resolution Light Microscope" A. Lewis, M. Isaacson, A. Harootunian and A. Muray *Ultramicroscopy* 13 (1984) 227-232.
"Super-resolution Fluorescence Near-field Scanning Optical Microscopy" A. Harootunian, E. Betzig, M. Isaacson and A. Lewis Appl. Phys. Lett. 49 (11), Sep. 15, 1986 pp. 674-676.
"New Form of Scanning Optical Microscopy", R. C. Reddick, R. J. Warmack, and T. L. Ferrell *Physical Review B* vol. 39, No. 1, Jan. 1, 1989 pp. 767-770.
"Optical Stethoscopy: Image Recording with Resolution $\lambda$20" D. W. Pohl, W. Denk, and M. Lanz Appl. Phys. Lett. 44 (7), Apr. 1, 1984 pp. 651-653.
"Near-field Optical-scanning Microscopy", U. Durig, D. W. Pohl, and F. Rohner J. Appl. Phys. 59 (10), May 15, 1986, pp. 3318-3327.
"Optical Characteristics of 0.1 $\mu$m Circular Apertures in a Metal Film as Light Sources for Scanning Ultramicroscopy" J. Vac. Sci. Technol. B 3(1), Jan./Feb. 1985 pp. 386-389.
"Development of High-Resolution Optical Scanning Fluorescence Microscopy" Satoshi Okazaki et al *Mikrochimica Acta* [Wien] 1988, III, 87-95.
"Scanning Tunneling Optical Microscopy" D. Courjon, K. Sarayeddine and M. Spajer, Optics Communication vol. 71, No. 1,2 May 1, 1989.
"A Light Source Smaller Than the Optical Wavelength", K. Lieberman, S. Harush, A. Lewis, and R. Kopelman *Science*, Jan. 5, 1989, vol. 247, pp. 59-61.
"Photophysics and Molecular Electronic Applications of the Rhodopsins" R. Birge Ann. Rev. Phys. Chem 1990 41:683-733.

(List continued on next page.)

*Primary Examiner*—Charles L. Bowers, Jr.
*Assistant Examiner*—John McPherson
*Attorney, Agent, or Firm*—Jones, Tullar & Cooper

[57] ABSTRACT

A stable, image-retaining, optically switchable film produced from a purple membrane in a high-pH polyvinyl alcohol solution forms an optical memory for data storage. The film, when dry, can be exposed to light to convert BR molecules to their M state, which is stable, and which allows long-term image storage. The image can be erased by exposing the film to yellow light to thereby switch all the molecules to the M state, and then a reverse image can be obtained using blue light. By controlling the location and wavelength of the incident light, pixels can be selected and exposed for information storage.

27 Claims, 12 Drawing Sheets

OTHER PUBLICATIONS

"Saturable Absorption, Wave Mixing, and Phase Conjugation with Bacteriorhodopsin" Werner et al, Optics Letters Oct. 15, 1990 vol. 15, No. 20 pp. 1117–1119.

"Biopolymers for Real-Time Optical Processing" Bazhenov et al Optical Processing and Computing ISBN 0-12-061170-3 pp. 103–142.

"Bacteriorhodopsin and its Functional Variants: Potential Applications in Modern Optics" Hampp et al; Chapter 29, pp. 954–975.

"Implementing Receptive Fields with Excitatory and Inhibitory Optoelectrical Responses of Bacteriorhodopsin Films" Hiroyuki Takei, Aaron Lewis, Zhongping Chen and I. Nebenzahl; *Applied Optics* vol. 30, #4, Feb. 1, 1991.

"Elements of a Unique Bacteriorhodopsin Neural Network Architecture" Applied Optics, vol. 30, #5, Feb. 10, 1991.

English language abstract of JP 2-251949, Tokunaga et al, (Oct. 1990).

"Biological Light-Sensitive Complexes as Technical Information Photocarriers", Vsevolodov et al., Biophysics vol. 30 No. 5 pp. 962–967 (1985).

(A) ORIENTED BR FILM (B) ETCH (C)

ORIENTED BIOLOGICAL MATERIAL FOR OPTICAL INFORMATION STORAGE AND PROCESSING

BACKGROUND OF THE INVENTION

This is a continuation-in-part of U.S. application Ser. No. 07/801,576, filed Dec. 6, 1991, now abandoned, and entitled "Biological Erasable Optical Storage Medium".

The present invention relates, in general, to optical information storage and processing, and more particularly to the use of oriented organic and biological molecules as media for optical information storage and optical information processing.

With the rapid growth of photonics technology, considerable effort is being directed toward the development of new materials for optical information storage and processing, and interest has focused on both organic and biological molecules as possible media. The search has already encompassed several materials, including bacterial membranes, which have been used for a variety of purposes, including second harmonic generation and dynamic holography. Of particular interest has been the protein known as bacteriorhodopsin (BR), which exhibits important photochromic and optoelectrical properties. This material has extremely large optical nonlinearities, and is capable of producing photoinduced electrical signals whose polarity depends on the prior exposure of the material to light of various wavelengths as well as on the wavelength of the light used to induce the signal, and these properties are useful for information storage and computation. Numerous applications of this material have been proposed, including its use as an ultrafast photosignal detector, its use for dynamic holographic recording, and its use for data storage.

Although the present invention is not limited to a particular material, it will be described in terms of its application to bacteriorhodopsin, which is the preferred material since the rhodopsins are a biologically important class of proteins which includes, for example, the visual rhodopsins which are responsible for the conversion of light into nerve impulses in the image resolving eyes of mollusks, anthropods, and vertebrates. Bacterial rhodopsins represent a related class of proteins that serve both photosynthetic and phototactic functions. The best known of this latter group is bacteriorhodopsin, which is very unique, since it is the only protein found in nature in a crystalline membrane. This crystalline membrane, which is called the "purple membrane", has BR as its sole protein component, and converts light into energy via photon-activated transmembrane proton pumping. Upon the absorption of light, the BR molecule undergoes several structural transformations in a well-defined photocycle wherein energy is stored in a proton gradient formed upon absorption of light energy. This proton gradient is subsequently utilized in the BR cell to synthesize energy-rich ATP.

The structural changes which occur in the process of light-induced proton pumping of BR are reflected in alterations of the absorption spectra of the molecule. These changes are cyclic, and under usual physiological conditions bring the molecule back to its initial BR state after the absorption of light in about 10 milliseconds. Although the molecular details of this photocycle are not fully known, most of the intermediate states which occur are well established. Thus, in less than a picosecond after BR absorbs a photon, the BR produces an intermediate, known as the "J" state, which has a red-shifted absorption maximum. This is the only light-driven event in the photocycle; the rest of the steps are thermally driven processes which occur naturally. The first form, or state, following the photon-induced step is called "K", which represents the first form of light-activated BR that can be stabilized by reducing the temperature to 90° K. This form occurs about 3 picoseconds after the J intermediate at room temperature. Two microseconds later there occurs an "L" intermediate state which is, in turn, followed in 50 microseconds by an "M" intermediate state. The steps in the photocycle not only are sensitive to temperature, but can be drastically altered by pH, humidity, and the resuspension of the membranes in $D_2O$. The intermediates L and M are particularly susceptible to these chemical environmental changes in the membrane.

There are two important properties associated with all of the intermediate states of this material. The first is their ability to be photochemically converted back to the basic BR state. Under conditions where a particular intermediate is made stable, illumination with light at a wavelength corresponding to the absorption of the intermediate state in question results in regeneration of the BR state. In addition, the BR state and intermediates exhibit large two-photon absorption processes which can be used to induce interconversions among different states.

The second important property is light-induced vectorial charge transport within the molecule. In an oriented BR film, such a charge transport can be detected as an electric signal. The electrical polarity of the signal depends on the physical orientation of molecules within the material as well as on the photochemical reaction induced. The latter effect is due to the dependence of charge transport direction on which intermediates (including the BR state) are involved in the photochemical reaction in question. For example, the polarity of an electrical signal associated with the BR→M photochemical reaction is opposite to that associated with the M→BR photochemical reaction. The latter reaction can be induced by light with a wavelength around 412 nm and is completed in 200 ns.

For the information storage and processing of the present invention, the intermediate states of bacteriorhodopsin are of particular interest, for at 77° K., the BR state and the K intermediates can be switched back and forth by the use of light with wavelengths corresponding to the absorption maxima of these intermediates. The switching time is a few picoseconds, so that this switching is very attractive for fast optical information processing. However, it does require very low temperatures to stabilize the K intermediate, and its absorption spectrum has a large overlap with that of the BR state, which reduces the contrast ratio; that is, the overlap prevents complete switching of all molecules between these two states. Because of these complications, switching between the BR and the M intermediate is more desirable.

The quantum yields for the forward and back photoreaction in switching between BR and M are similar to those for switching between BR and K. Although its switching time is not as fast as K, the absorption band of M is distinct from that of BR and this allows complete switching of the BR molecules to the M intermediate and reduces, in comparison to other photochromic materials, the power needed to accomplish this optical switching. Furthermore, the time required to initiate the transition between BR and M is much shorter than the total transition time because of the fact that once BR is photochemically switched to the primary photochemical product J, which takes place in less than 1 picosecond, all molecules that have reached the J state will then automatically thermally relax to the M state. An additional advantage of the M state is that it can be stabilized at a much higher temperature, about 208° K. than is required to stabilize the K state.

In addition to the large quantum yields and distinct absorptions of BR and M, the BR molecule has several intrinsic properties which are of importance in optics and which, therefore, make this material preferred for the present invention. First, this molecule exhibits a large two-photon absorption cross section. Second, the crystalline nature and adaptation to high salt environments makes the purple membrane very resistant to degeneration by environmental perturbations and thus, unlike other biological materials, it does not require special storage. In fact, dry films of purple membrane have been stored for several years without degradation. Furthermore, the molecule is very resistant to photochemical degradation, and in experiments a film of purple membrane was switched between its BR and M states more than $10^6$ times with no noticeable change. The use of BR is also important to the invention because both the spectrum and kinetic aspects of the BR photocycle can readily be modified by replacing the light-absorbing component of the protein. This component is a retinal (vitamin A)—like chromophore, which can be replaced by natural and synthetic analogs which can shift the BR spectrum to virtually any color. Also, genetic mutants of BR can be produced by biotechnological procedures to affect both the kinetic and spectral properties of BR. Finally, BR and its associated M state have a very large second order nonlinear susceptibility which can be used to read without erasing.

SUMMARY OF THE INVENTION

Accordingly, it is an object of the invention to provide an organic medium suitable for the processing and storage of optical information.

It is another object of the invention to provide an oriented medium with stabilized intermediate states for molecular information storage and processing.

It is a further object of the invention to provide a biological light-to-electrical signal transducer which is capable of performing optical and electro-optical processing at the sensor level.

It is another object of the invention to provide an organic medium capable of modulating the transmission of a light beam by the imposition of appropriate light and/or electric signals.

Another object of the invention is to provide an organic medium having an oriented molecular structure for use in storing (writing) optical and electro-optical data, the film being capable of retaining data while permitting nondestructive detection (reading) of such data, and being capable of reuse after optical erasure of data.

A still further object of the invention is the provision of a method for storing optical information in a biological medium.

Another object of invention is the provision of a method for nondestructively reading information stored in an optical memory system, both in a two-dimensional and in a three-dimensional medium.

It is a still further object of the invention to utilize the nonlinear properties of a biological medium such as BR for optical information processing and storage.

Briefly, in one form of the invention a stable, image-retaining, optically switchable medium is provided for use in a wide range of applications as an optical memory. The medium, in a preferred form of the invention, is a biological material having an oriented molecular structure, wherein all of the molecules are in the same direction or are in specified directions. The material may be in the form of a thin film or membrane, which may be referred to as an essentially two-dimensional film, or may be in the form of a thick film which may be referred to as an essentially three-dimensional layer or block. This medium is preferably is produced from a purple membrane in a polyvinyl alcohol solution wherein the pH of the solution is adjusted to a high value, for example, about 10, the resulting high pH BR-PVA solution being spread on a substrate and dried. The dried film so produced includes BR molecules which can then be exposed to light to convert the molecules to their M state. The high pH of the film affects the decay time of the light-induced M state, stabilizing that state and making it possible to impress long-lasting optical images on the BR-PVA film, even at room temperature. By exposing the material to light of a selected wavelength through a mask representing an image; i.e., by optically writing an image, selected molecules can be optically switched to the M state, which may have a yellow color, while leaving the remaining, unexposed molecules in the initial purple BR state. The image so formed on the film can be stored and nondestructively read, as will be explained below, or can be erased by exposing the entire film to yellow light, thereby switching all of the BR molecules to the M state. Then, by illuminating (optically writing) the film with a blue light, a reverse image can be obtained on the same film, the exposed molecules this time switching back to the BR state, and the remaining molecules remaining in the M, or yellow state. These cycles can be repeated, thereby providing a writable, readable, erasable, and rewritable optical film.

The image formed on the film can represent any kind of information which can be formed as individual data points on the individual BR molecules in the film. The larger the number of individual BR molecules in the film, the greater the optical density (O.D.), and the greater the resolution of images stored therein. Selected groups of molecules, and in some cases individual molecules, can represent a pixel of data. By controlling the location and wavelength of the incident light, individual pixels can be selected and exposed for writing information, for reading previously written, or stored, information, or for erasing it. Because each molecule is affected only by light incident on it, and not by the state of the next adjacent molecule, image or data storage resolution is high. The limiting factors for resolution are the density of molecules in the film and the ability of the light source to address a spot as small as a molecule.

In a preferred form of the invention, the BR molecules in the BR-PVA film are oriented so that pixels in the film will not only change colors when illuminated, but will exhibit electrical properties and nonlinear optical properties which correspond to the color changes. Orientation, or alignment of the molecules in the medium is obtained, in accordance with a preferred form of the invention, by first forming the BR-PVA film to have a neutral pH, drying the film, and then diffusing a high pH buffer into the film. This procedure forms a highly oriented, high pH film in which the M state will be visually stable at room temperature. The optical nonlinearity of the molecules in such a highly oriented film allows second harmonic light waves to be used to nondestructively detect the state of the molecules, and this allows second harmonic microscopy to be effectively used to read previously stored data without erasure.

The optical film described above forms a two-dimensional (2-D) storage device; however, the invention can be extended to a three-dimensional (3-D) layer or block of material, since BR can be oriented and embedded in a variety of host materials. Accordingly, the present invention is also directed to a three-dimensional optical storage system that uses the nonlinear optical properties of oriented biological molecules for writing and for nondestructive reading, and which has the same advantages of high resolution as is provided in a two-dimensional system. Such a 3-D system can be used as an optical memory.

Writing in a BR-based 3-D memory is performed by two-photon absorption, and reading is accomplished by second harmonic generation. Because both two-photon excitation and second harmonic generation require two photons and the nonlinear response depends quadratically on the light intensity, reading and writing in a 3-D memory can be accomplished by this nonlinear process at a selected pixel with either a single focused beam or the overlap (or intersection) of two beams. The response of the optical medium thus is confined to the pixel at the focal plane of the incident beam in the case of a single focused beam, or to the overlap region in the case of two beams. Writing with two-photon absorption is nondestructive since the wavelength of the writing beam or beams can be chosen to be outside the one-photon absorption band of the optically responsive molecules, or chromophores, within the memory device. Reading with second harmonic generation is also nondestructive of data previously written, and does not have the problem of crosstalk if the reading light beam has the wavelengths of fundamental and second harmonic photons outside the absorption band of the optically responsive molecule.

In a second form of the invention, a light-to-electrical signal transducer (henceforth referred to as a detector) is provided, utilizing a medium incorporating oriented molecules. In a preferred form of this embodiment, BR molecules embedded in a thin, dry purple membrane are oriented in such a way that the vectorial transport of electrical charge has a component predominantly in a direction perpendicular to the membrane surface. When such a membrane is exposed to light, a photo-induced signal can be measured across it. Local heterogeneities can be introduced into this detector to affect the direction of the photo-induced electrical charge transport. In one such scheme, the local heterogeneities are in terms of the physical orientation of individual molecules. The orientation of molecules may vary in the surface of a 2-D detector film, and in such a detector, the polarity of a photo-induced electrical signal will depend on the precise location of the photon absorption on the detector surface. In another scheme, the local heterogeneities are in terms of the molecular compositions of intermediates. Because different photochemical reactions result in electrical signals of different polarities, the polarity of the net electrical signal is determined by the sum of all electrical signals contributed by all the intermediates present in the region exposed to light. Similarly, the polarity of the net electrical signal depends on the specific spectral content of the illuminating light.

Both of the detector schemes described above can perform arithmetic operations, both addition and subtraction, on optical signals. Real-time incoherent optical subtraction on the sensor level is a unique capability of this invention.

It has also been found that the oriented medium of the present invention is capable of modulating light and/or electric fields, when appropriately prepared with light or electric fields, so that a BR-PVA oriented film can modulate light beams passing through it.

In summary, the invention provides an oriented biological medium with high optical quality in which images can be written and erased repeatedly over $10^6$ cycles or more. Using the non-linear optical characteristics of such a medium, such images can be read nondestructively using second harmonic microscopy, thereby demonstrating the applicability of biological media as an erasable optical storage medium. The same material can be used to construct a 3-D optical data storage device wherein writing is performed by two-photon absorption and reading by second harmonic generation. In particular, BR-PVA films are found to have the desired characteristics, and furthermore BR is found to have unique photoelectrical and magnetic characteristics, in that the polarity of the electrical signal produced by the material depends on both the state of the protein and the wavelength of excitation. Thus, the photoelectrical properties of BR have a wide range of applications including the ability to perform real-time incoherent optical addition, subtraction, edge enhancement and motion detection.

BRIEF DESCRIPTION OF THE DRAWINGS

The foregoing and additional objects, features and advantages of the present invention will become apparent to those of skill in the art from a consideration of the following detailed description of preferred embodiments thereof, taken in conjunction with the accompanying drawings, in which.

DESCRIPTION OF PREFERRED EMBODIMENTS

Figure 1:
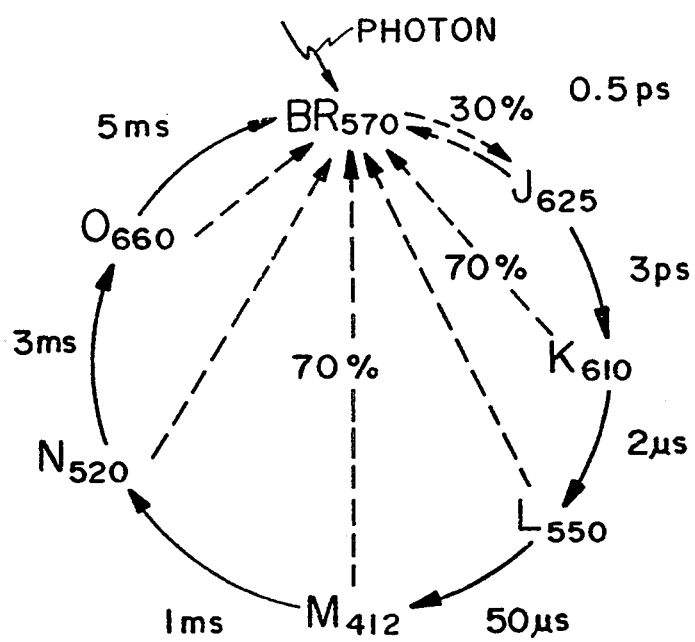
FIG. 1 is a diagrammatic illustration of the photochemical cycle of the bacteriorhodopsin (BR) molecule.
Figure 2:
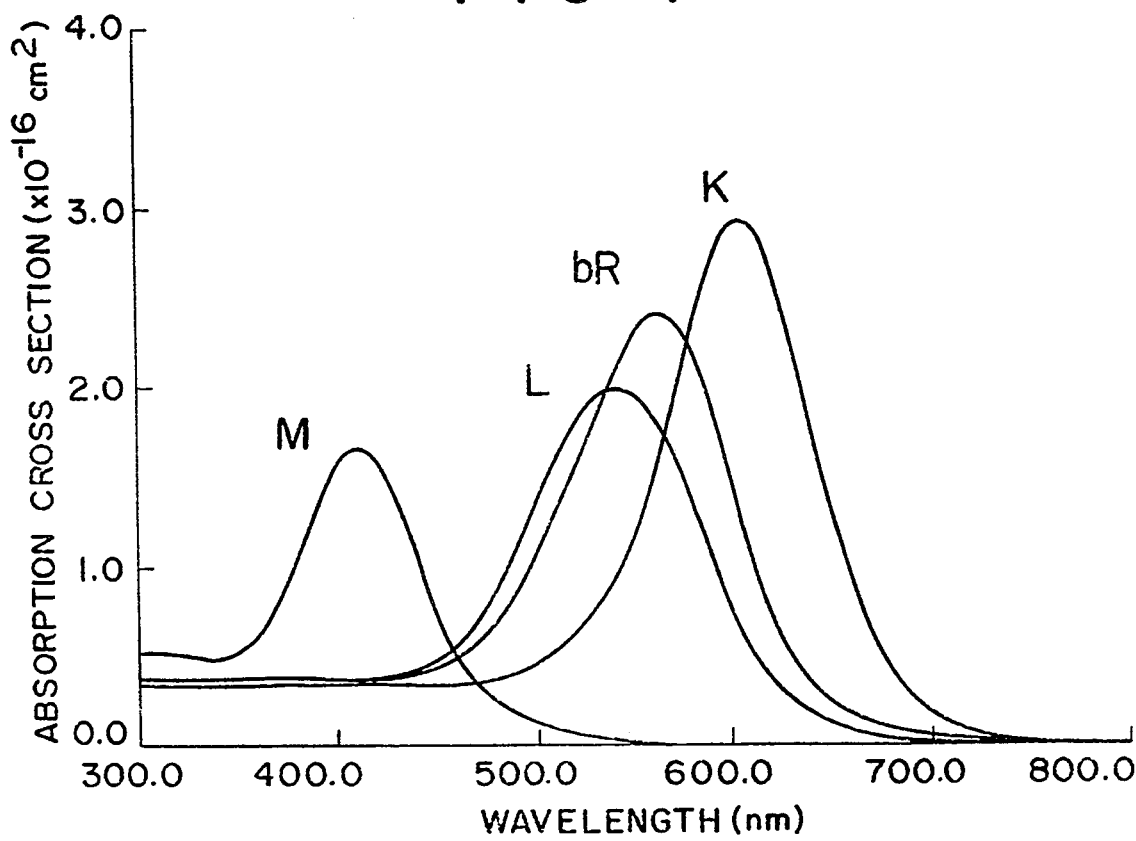
FIG. 2 is a diagrammatic illustration of the absorption spectra of the corresponding intermediates of BR produced in the cycle of FIG. 1.

Turning now to a more detailed consideration of the present invention, there is illustrated in FIG. 1 in diagrammatic form a generally accepted scheme for a BR photocycle. In this diagram, the dashed lines indicate photo-driven processes and the solid lines indicate thermal transformations. FIG. 2 shows the absorption spectra corresponding to the photodriven processes. As previously indicated, the physiological role of BR is to convert light energy into a proton gradient across the bacterial cell membrane. In the process of light induced proton pumping, BR undergoes a series of very rapid structural changes, some of which result in alterations in the absorption spectra of the molecule. As indicated in FIG. 1, these changes are cyclic and under normal physiological conditions bring the molecule back to the initial state in 10 microseconds.

As illustrated in FIG. 1, less than a picosecond after BR absorbs a photon, the BR molecule produces an intermediate with a red shifted absorption maximum J, indicated in FIG. 1. As illustrated by the dashed line, this is the only light-driven event in the normal photocycle; the rest of the steps are thermally driven processes. Thus, at room temperature, the J intermediate decays into a K intermediate in three picoseconds and then decays sequentially to L and then M intermediates in two microsecond and fifty microsecond intervals, respectively. The decay rates of these intermediates can be drastically altered by pH, humidity, and the resuspension of the membranes in $D_2O$, with the intermediates L and M being particularly susceptible to these chemical changes in the membrane. At room temperature, the M intermediate decays thermally through N and O intermediates back to the initial BR state in one microsecond, three microsecond, and five microsecond steps, respectively, in sequence to complete the photocycle.

Important properties of all the intermediates are (1) their ability to be photochemically switched back to BR by shining light at a wavelength that corresponds to the absorption spectrum of the intermediate state in question; (2) the fact that the polarity of the electrical signals induced in the process is reversible; and (3) the gigantic nonlinearities that can be selectively excited in each of the intermediates. The peak of the absorption spectrum for each of the intermediates is indicated by the numerical subscripts in FIG. 1. Thus, BR responds to light having a wavelength in the spectral region of 570 nm, while the M intermediate responds to light in the spectral region of 412 nm. This ability to shift from M back to BR in response to light at specific wavelengths makes BR an ideal material for erasable optical storage, as will be explained below. However, because the photocycle of FIG. 1 is continuous at room temperature and is relatively short-lived, the intermediate states are unstable and must be cooled to relatively low temperatures in order to stabilize them. Thus, for example, the K and M intermediate states become stable at 77° K. and 210° K., respectively, and can then be switched back and forth by the use of light with wavelengths corresponding to their indicated absorption maxima. The switching time is a few picoseconds for the K intermediate and this aspect is very attractive for fast optical information processing, but the very low temperature required for stabilization makes the K intermediate less attractive. Furthermore, its absorption spectrum has a large overlap with that of the BR state, preventing complete switching of all molecules between the two states and reducing the contrast ratio. However, the M state can be made stable at a higher temperature, for example, about 208° K., and although its switching time is not as fast as the K intermediate, its absorption band is distinct from that of BR so that there can be a complete switching of BR molecules to M, and vice versa, thereby providing a high contrast ratio. It is also noted that although the time required to complete a transition between BR and the M intermediate state is longer than that required for a transition to the K state, the time required to initiate the transition by a light beam is only 0.5 picoseconds, for that is all the time required to shift the BR to its J intermediate. Thereafter, the shift is carried out thermally to the M intermediate.

A BR-containing film for use in the present invention is produced, in accordance with one embodiment, by dissolving a polyvinyl alcohol (PVA) in a buffer to form a PVA solution, dissolving a BR material in a buffer to form a BR solution, adjusting the pH of the BR solution to produce a high pH BR solution, mixing the PVA and BR solutions to form a BR-PVA solution and then forming a film of that solution. The film is then dried and thereafter may be exposed to an optical image to switch the state, and thereby the color, of exposed BR molecules, thereby forming an image in the film. This image, as will be shown below, can be read without erasing it, and also can be erased. Furthermore, the film is reusable and may be shifted between states in excess of $10^6$ times without degrading the material.

The purple membrane may be purified from Halobacterium Halobium in any well known manner, as described, for example, by D. Oesterhelt and W. Stockenius, "Isolation of the Cell Membrane of Halobacterium Halobium and Its Fractionation into Red and Purple Membrane", *Methods Enzymol* 31, 667 (1974). To make an oriented BR-PVA film, a 15% (w/v) polyvinyl alcohol with a molecular weight of 40,000 is dissolved in a 50 mM HEPES buffer by heating to 98° C. A 0.15 mM BR solution is dissolved in a quantity of HEPES buffer, and one ml of the resulting BR buffer solution is mixed with 9 ml of the PVA solution, after the PVA solution has cooled to room temperature. The resulting BR-PVA solution is then de-gassed by spinning the solution at 5,000 rpm in a centrifuge to remove any residual bubbles. To form a film, a substrate consisting, for example, of a 5 centimeter diameter pyrex glass sheet is treated with chromerge at about 80° C. and thereafter a volume of 4 ml of the BR-PVA solution is spread onto the substrate. Filtered air is used to purge uniformly the film surface as the film is allowed to dry over a period of approximately 24 hours. Typically, the film has a thickness of about 150 to 200 microns, with an optical density at 570 nm of about 0.15. The absorption spectrum of such a BR-PVA film shows no detectable difference from that of the purple membrane when it is suspended in solution.

Figure 3:
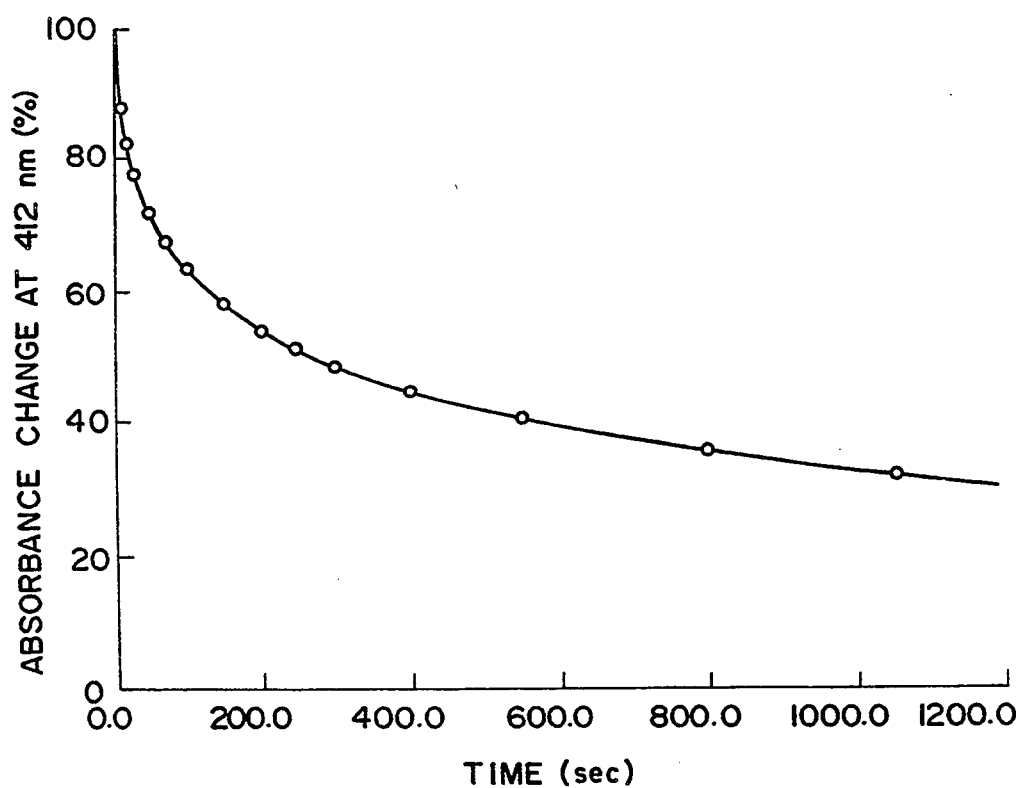
FIG. 3 is a diagram of the decay of the M state of high pH BR film, as monitored by the relative change in the absorbance of light at 412 nm.

The M intermediate in the film produced in accordance with the foregoing procedure is stable at approximately $-65°$ C. but not at room temperature. However, by adjusting the pH of the BR buffer solution to 10, prior to forming the film, a dramatic increase in the stability of the M state occurs. FIG. 3 illustrates the decay of the M state in such a high pH dry film at room temperature (23° C., 20% relative humidity) with the decay of the M state being monitored by the absorbance change of light at 412 mn. The open circles in FIG. 3 are experimental data and the solid line is the best fit to the experimental data, where the change in absorbance A is in accordance with the following decay function:

$$\delta\delta A(t) = \Sigma A_i \exp(-t/\tau_i) \quad \text{(Eq. 1)}$$

where $A_i$ is the relative amplitude of the applied light, t is time in seconds and $\tau_i$ is the decay time constant. The best fitting parameters are listed in the following table, where data from two BR films having a pH of 7 are also included for comparison.

TABLE

DECAY TIME CONSTANTS AND RELATIVE AMPLITUDES OF THE M STATE OF BR FILM

| sample | Relative Humidity (%) | $\tau_1 (A_1)$ |
|---|---|---|
| A | 20 | 16.8 (0.20) |
| B | 10 | 0.9 (0.28) |
| C | 43 | 0.244 (0.3) |

| sample | Relative Humidity (%) | $\tau_2 (A_2)$ |
|---|---|---|
| A | 20 | 150.2 (0.30) |
| B | 10 | 1.8 (0.35) |
| C | 43 | 1.25 (0.4) |

| sample | Relative Humidity (%) | $\tau_3 (A_3)$ |
|---|---|---|
| A | 20 | 2323.4 (0.50) |
| B | 10 | 28.8 (0.36) |
| C | 43 | 10.1 (0.28) |

Figure 4:
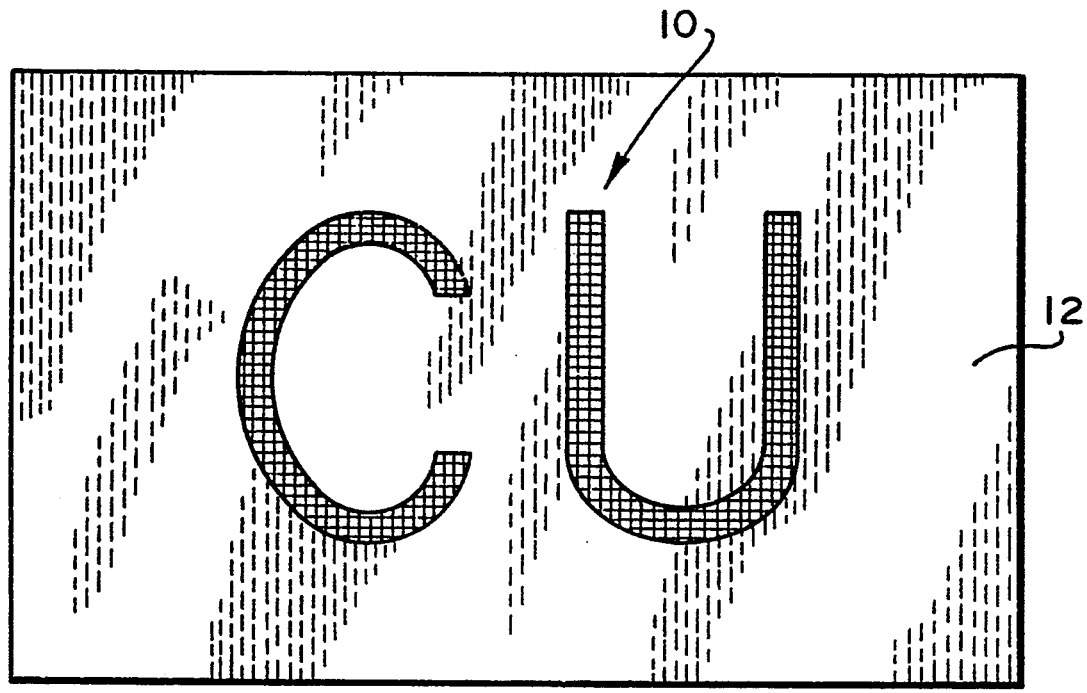
FIGS. 4 and 5 illustrate images produced on an optically switchable BR-PVA film formed in accordance with the present invention, FIG. 4 representing an image formed by illuminating the film through a mask with yellow light and FIG. 5 representing a reverse image formed on the same film by first erasing the image by illuminating the entire film with yellow light and then illuminating the film through the same mask with blue light.
Figure 5:
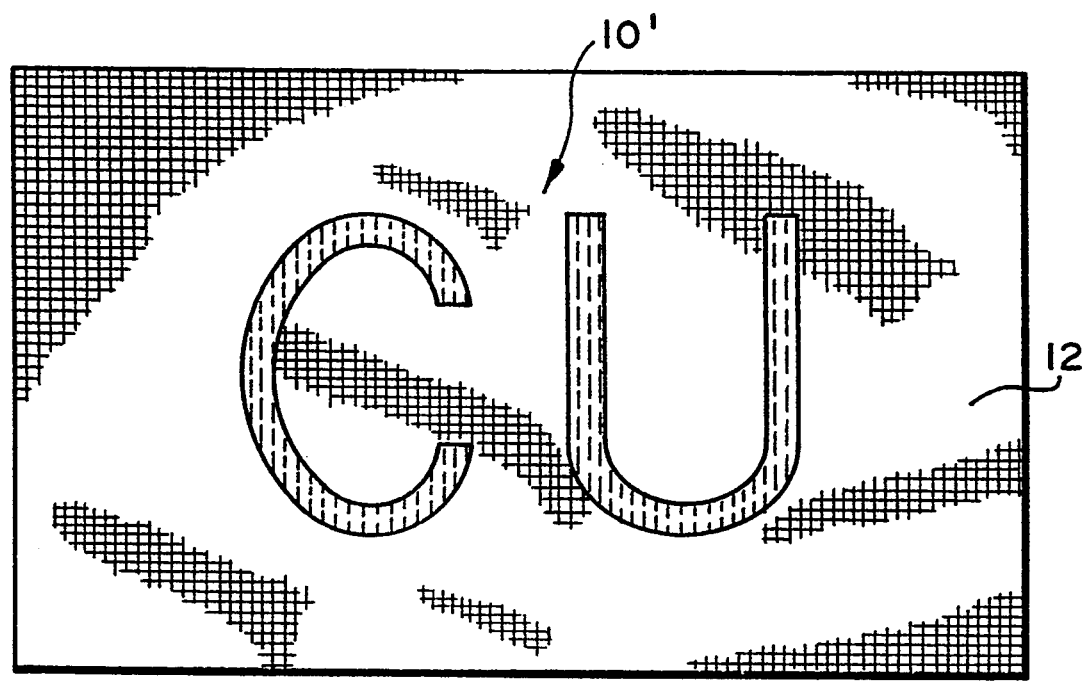

Sample A in the table is a high pH dry film while samples B and C are measurements made on dry films made from neutral pH solution, as reported by R. Korenstein and B. Hess in "Hydration Effect on the Photocycle of Bacteriorhodopsin in Thin Layers of Purple Membrane" *Nature* 270, 184 (1977). As illustrated in the Table, the decay time of the M state of high pH film increases about 2 orders of magnitude compared to the neutral pH film. The significant increase in the M state lifetime resulting from the use of a high pH BR solution has made it possible to impress images on the BR-PVA film even at room temperature. FIGS. 4 and 5 illustrate a room temperature image 10 impressed on such a film 12. In FIG. 4, two letters C and U are formed by molecules that have been optically switched to the yellow M state with background molecules in the purple BR state. The image 10 is formed by illuminating the BR-PVA film 12 described above through a mask with yellow light such as that available from a 100 watt projection lamp filtered with a 550 nm long pass filter.

FIG. 5 is the reverse image 10' on the same film 12, where the letters C and U are formed by molecules in the BR state and the background by molecules in the M state. This image 10' was formed from the film 12 of FIG. 4 by first erasing the letters 10 illustrated in FIG. 4 by directing yellow light to the entire substrate to switch all of the BR molecules to the M state, and then by illuminating the film 12 through the same mask with a blue light. The blue light was obtained with the same 100 watt light source filtered with a Schott glass KG1 filter, to thereby shift the exposed molecules to the purple BR state.

Measurements of BR molecules in a BR-PVA film that is formed with a neutral pH indicate that the BR molecules are oriented. However, it has been found that BR-PVA films formed at a high pH do not have oriented BR molecules, with the result that certain electrical properties such as photovoltage and certain nonlinear effects such as second harmonic generation are not excitable. Accordingly, in order to provide that orientation and thereby to obtain the desired electrical properties and nonlinear effects, the BR-PVA films are formed, in accordance with the present invention, with a neutral pH and after the film has dried, a high pH buffer is diffused into the film. This procedure produces a highly oriented, high pH film with the M state visually stable at room temperature.

Oriented BR films are important for a wide variety of fundamental studies on purple membrane. For example, these films have made important contributions to studies on the proton pump mechanism, the photocycle parameters, and energy-transduction mechanisms. Purple membrane can be oriented in a number of ways. These include incorporation into positively charged bimolecular lipid membranes, in polyacrylamide gels, adsorption to cationic surfaces, and by electrophoresis of suspensions of purple membrane, all of which are described in the literature. The latter method can be used because the purple membrane carries negative charges at neutral pH and because there is a dipole moment with the purple membrane that is a result of the transmembrane alpha helices which constitute the BR molecules embedded in the membrane. However, the oriented films made by that technique are not very uniform, especially at low BR concentration. In order to obtain good optical quality and a high degree of orientation, oriented BR in a PVA film has the best optical quality and, since PVA is widely used, the processing technology for PVA films is well developed.

Figure 6:
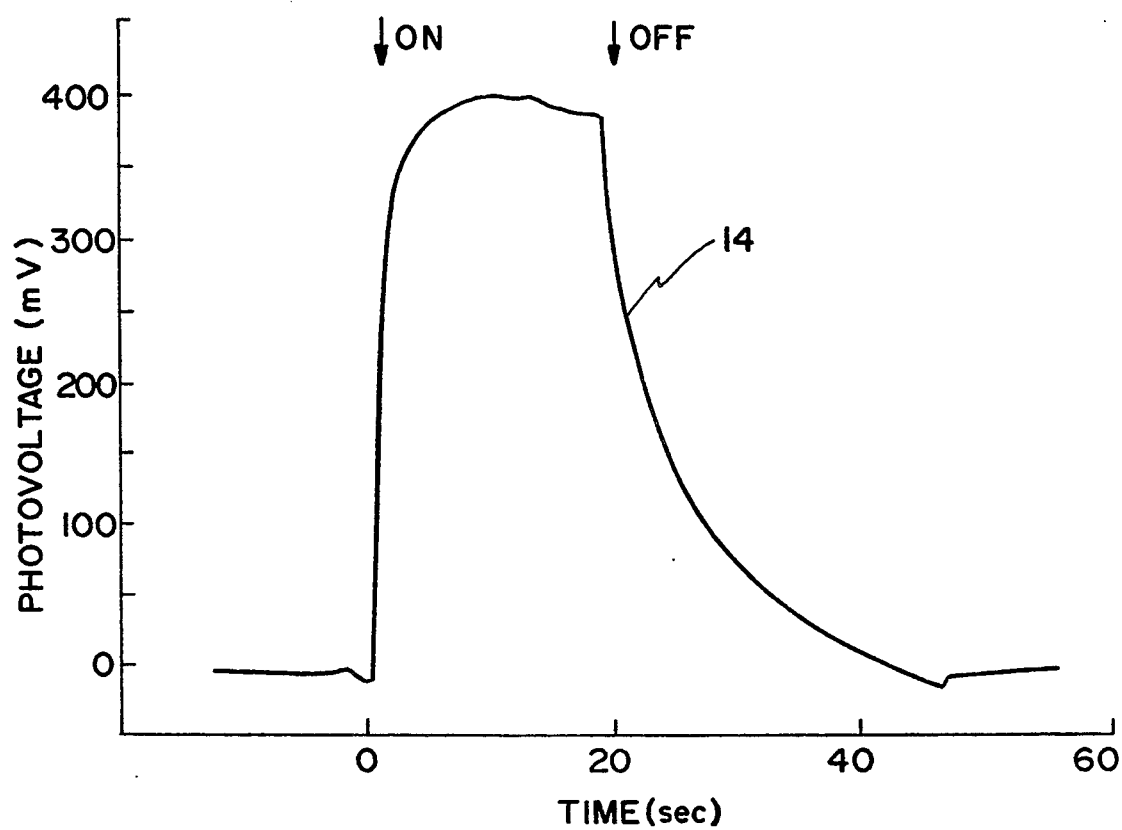
FIG. 6 is a graphical display of the photovoltage from a BR-PVA film having a thickness of about 170 $\mu$m and an optical density of 0.13.

The orientation of the BR molecule in a BR-PVA film can be measured by the photoelectric response of the BR resulting from the photocycle of FIG. 1. The electrical signal produced by a typical photoresponse of a BR-PVA film is graphically illustrated in FIG. 6 by curve 14. In a test for detecting this signal, a BR-PVA film was removed from its substrate and cut into small pieces of approximately 0.5 cm by 1 cm. A sample of the film was then sandwiched between two transparent electrodes formed by glass coated with $SnO_2$, and the signal was measured with an electrometer. The sample was illuminated with a 100 watt tungsten halogen projection lamp filtered with a long pass 550 nm filter. The upper surface of the film (which was the surface not in contact with the substrate on which the PVA film was dried) was connected to the positive electrode of the electrometer and the lower surface was connected to ground. The voltage measured across the film was about 300 mV, a value quite large considering the relatively small optical density of 0.13 for the film, thus indicating that the BR was oriented in the film.

The orientation of the BR can also be evaluated by measuring the second harmonic (SH) response of these films, and comparing the resulting signals to those generated from electric field oriented purple membrane on glass slides. It is known that samples of purple membrane oriented by electrophoresis consistently have a high degree of orientation, and by comparing the second harmonic signals generated from both electric field oriented samples and from BR-PVA films, the relative degree of orientation of the BR in the BR-PVA films can be determined. In measurements made of high pH films formed in accordance with the present invention, the ratio of signals from the PVA signals to the electric field oriented samples was a factor of two higher than predicted, thus indicating that BR is oriented in the BR-PVA film to at least the same degree as the dry BR films oriented by electrical fields.

A problem with all photochromic materials in optical memories is that the erasure of a stored image, or information, is unavoidable when optical readout is obtained by using a light beam which is in resonance with one of the states of the photochromic material. However, the large and different non-linear properties of BR and its M state allow for second harmonic microscopy to be effectively applied to read an image in BR without erasure. In essence, an infrared beam can be chosen which has a wavelength, or frequency, out of the absorption range of BR but which has a second harmonic frequency within the absorption range of the BR material. With such a beam, which may be generated by a laser, for example, a non-destructive read operation can be performed in which the infrared light has no one-photon resonant absorption effect on the BR. Furthermore, the second harmonic of the incidental reading beam has no destructive effect on either the BR or its M state, since the resonantly enhanced second harmonic signal is produced by a virtual transition. Such a read method requires a photochromic material with a large optical nonlinearity, and this is available with the BR material of the present invention.

Figure 7:
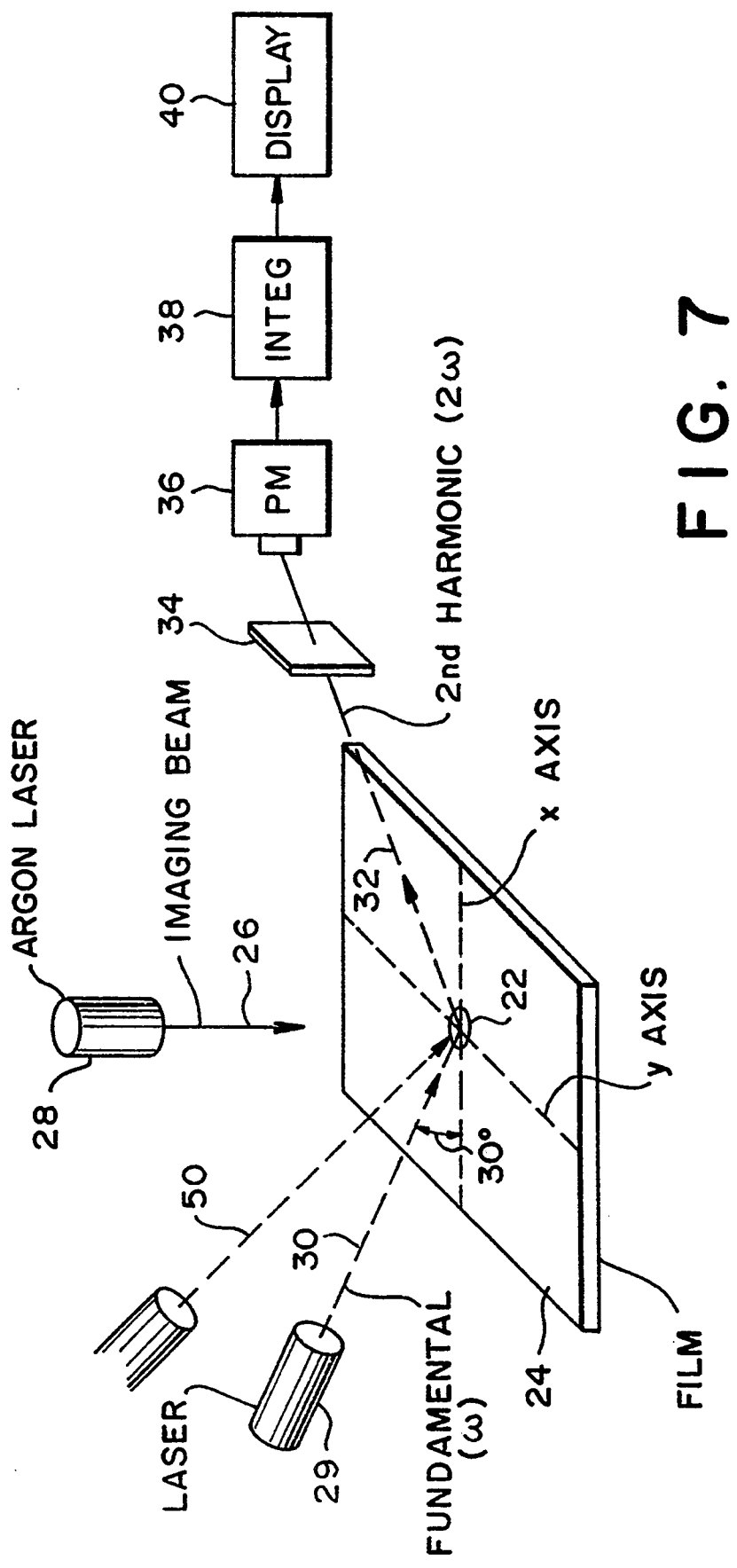
FIG. 7 is a diagrammatic illustration of a non-destructive second harmonic image reading process.

A non-destructive read operation of an image formed by M states in a background of BR can be performed in the manner illustrated in FIG. 7. First, an image 22 is formed on a BR-PVA film 24 by means of, for example, a focused 514.5 nm beam 26 from an argon ion laser 28. The laser 28 pumps the film 24 in the localized region of the image to be formed to produce the M state in the exposed BR molecules. This M state image may, for example, be a dot such as the dot 22 on the BR-PVA film, or may be any arbitrary image.

Figure 8:
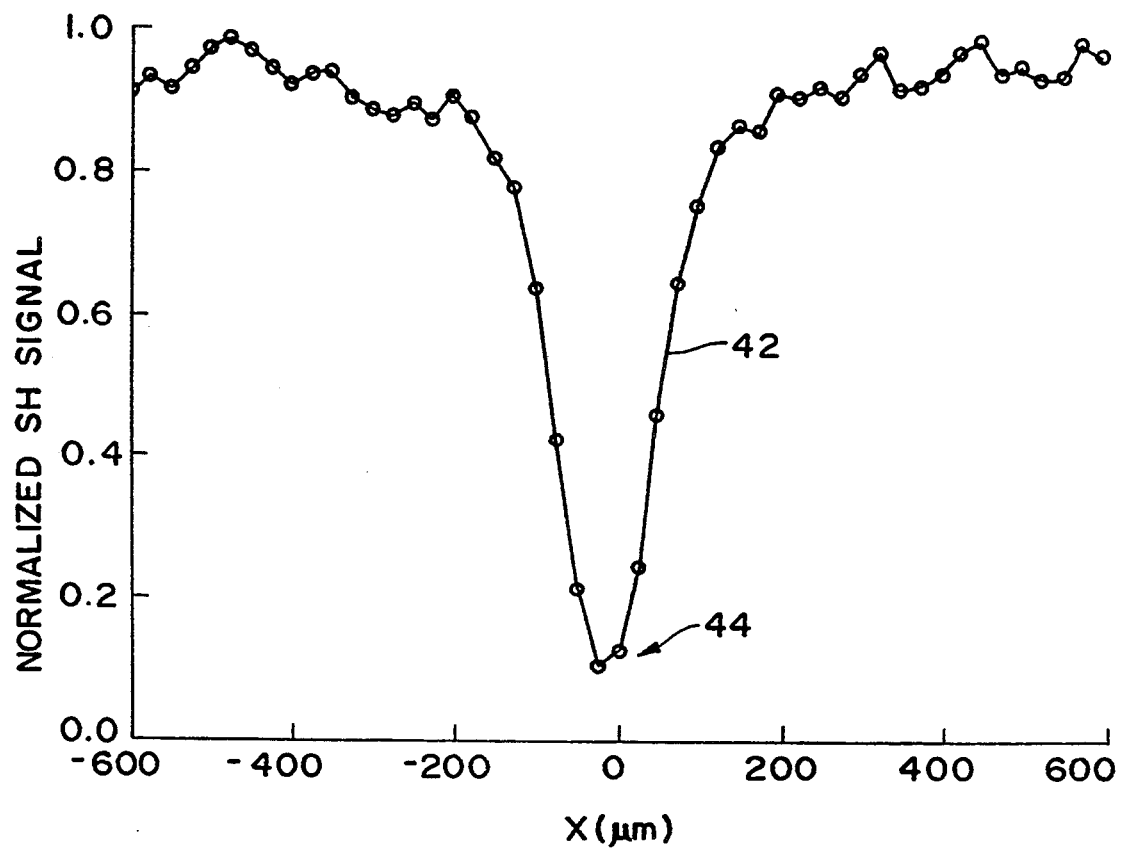
FIG. 8 is a graphical display of the second harmonic image of the pattern of a dot of molecules in the M state on a BR-PVA film, wherein the pattern is formed by a focused argon ion laser beam which pumps the molecules in the illuminated region at the zero point of the x axis to the M state.

The non-destructive reading of this dot of M state material 22 is carried out by the fundamental output read beam of a Q switched Nd: YAG laser 29 with a 10 Hz repetition rate and a 10 ns pulse width. The read beam 30 from laser 29 has a power of 15 mW and is focused on the film 24 with an incident angle of 30°. The beam is scanned in steps along X and Y axes of the film with a 25 μm step size. Second harmonic photons at 532 nm are produced by the film, as indicated at 32, and can be spectrally filtered by filter 34 and detected by a photomultiplier 36. At each step of the scan, 50 pulses of the laser are averaged, as by a box car integrator 38, and the resulting second harmonic line scan is displayed on display screen 40. A typical line scan which passes through the M dot 22 is illustrated in FIG. 8 by curve 42, which shows a pronounced dip 44 in the second harmonic signal where the scan passes through the dot. A three dimensional image of a number of scans across the sample and passing through the M dot is plotted in the graph of FIG. 9, with the Z axis of second harmonic intensity being reversed for clarity. The graphical illustrations of FIGS. 8 and 9 clearly show that second harmonic generation is capable of detecting an image formed by BR and M states in a BR-PVA film.

Figure 9:
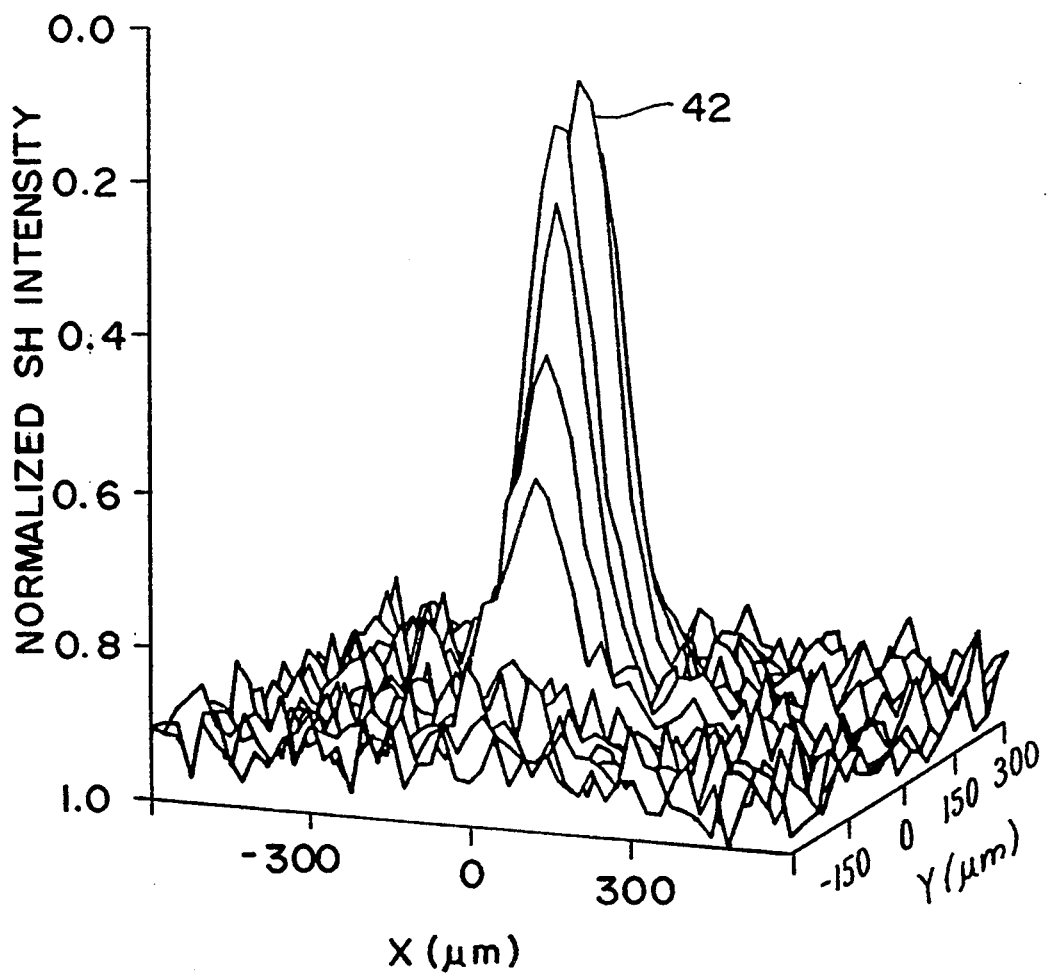
FIG. 9 is a three dimensional image of the pattern of FIG. 7, with the z axis reversed for clarity.

The small fluctuations in the curves plotted in FIGS. 8 and 9 represent noise which is principally due to fluctuations of the intensity of laser 29. The line scan which shows the largest contrast between the BR and M materials is indicated at 42 in FIG. 9 and shows a ratio of the magnitude of the BR signal to the magnitude of the M signal of about 10. This ratio can be improved by adjusting the wavelength of the imaging laser 28 to about 570 nm so that a larger percentage of BR will be switched to the M state at the location of the image.

Figure 10:
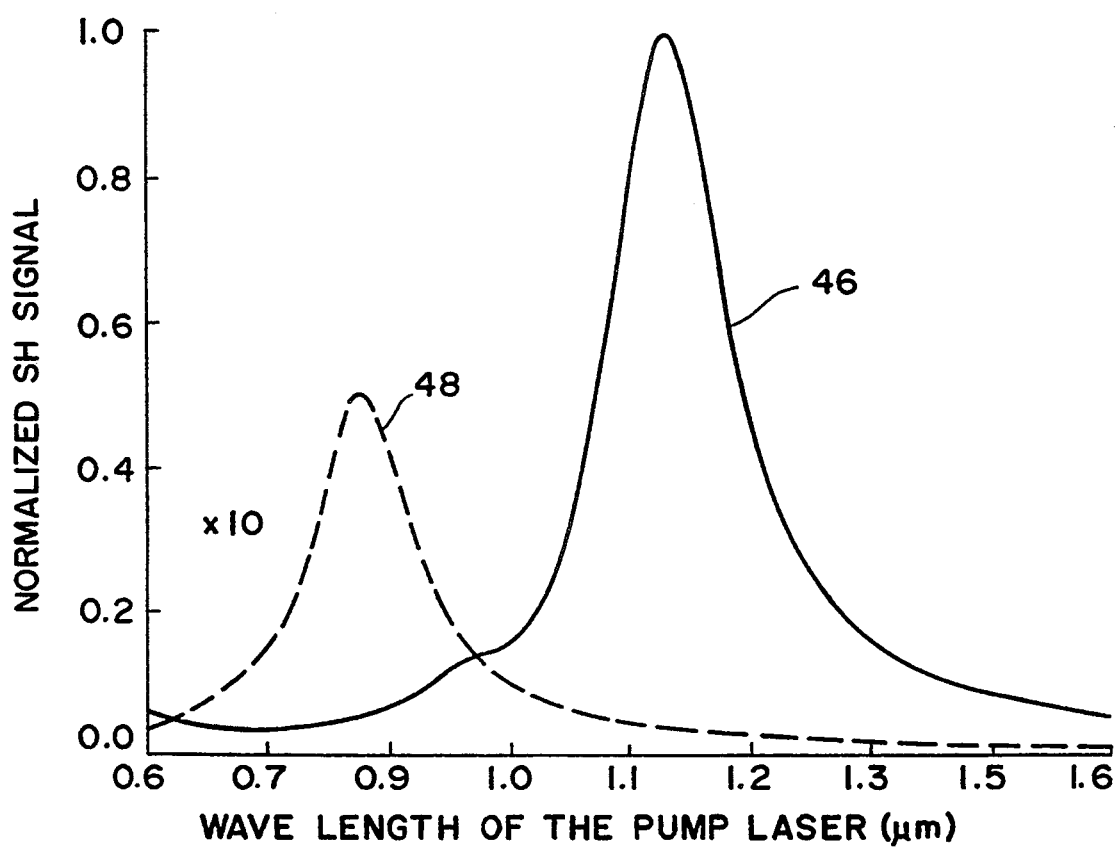
FIG. 10 is a graphical illustration of a normalized second harmonic signal illustrated as a function of the fundamental wavelength of the excitation optical signal, the second harmonic from the BR state being shown by the solid line and the signal from the M state being represented by the dashed line.

Since the second harmonic signal is proportional to the square of second order nonlinear susceptibility of the medium, the theoretical limit on the contrast ratio between BR and M can be predicted by calculating the susceptibility as a function of wavelength. This is illustrated in the graph of FIG. 10, where the solid line 46 is the normalized second harmonic signal as a function of wavelength for the BR state and the dashed line 48 is for the M state. For a fundamental wavelength of 1.06 micrometers, the predicted ratio of second harmonic signal from the BR to that from the M state is 83, which is very close to the experimental value of 88. It can also be seen from this graph that the wavelength for optimal contrast is 1.14 micrometers. At this wavelength, a contrast ratio of about 200 is predicted for the BR and M states found in native bacteriorhodopsin. Improvements in the signal to noise ratio for this contrast ratio can be obtained by using a second nonerasing laser beam 50 (See FIG. 7) in addition to beam 30, where the second harmonic wavelength of one beam is resonant with the BR and that of the other beam is resonant with M. A measurement of the ratio of the BR/M response using two such beams enhances detectability of pixels if complete switching has not occurred.

Figure 11:
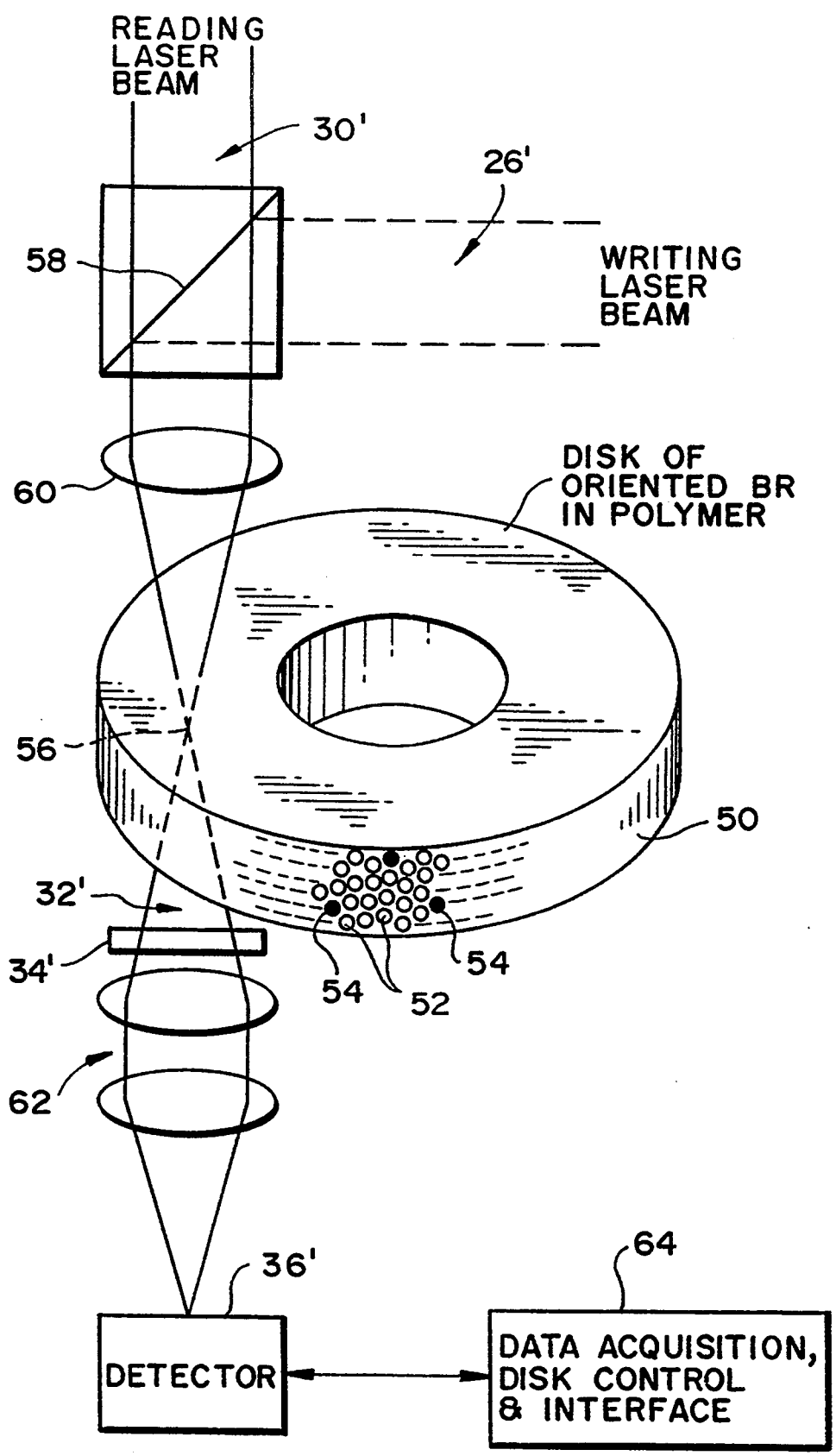
FIG. 11 is a schematic representation of a BR-based 3-D optical memory.

A three-dimensional memory element 50 is illustrated in FIG. 11 in the form of a disk of polymeric material in which is embedded a multiplicity of oriented biological molecules 52, preferably BR. In such a device data can be written into selected molecules or groups of molecules (pixels), as indicated by color-changed molecules 54, by the two-photon method described above, using a write beam 26' such as the beam 26 illustrated in FIG. 7. Beam 26' is directed to a selected pixel, such as pixel 56 within disk 50, by movable mirror 58 and focusing lens 60. Writing by the two-photon method requires materials that have both larger two-photon cross section and second order susceptibility. BR not only has a large second order nonlinear optical susceptibility, but also has a large two-photon cross section. Nondestructive reading of selected pixels, again, for example, pixel 56, is carried out by a reading beam 30' which is similar to beam 30 in FIG. 7, and which is directed through beam splitting mirror 58 and lens 60 and is focused on the pixel to generate a second harmonic beam 32'. Beam 32' is directed through filter 34" and suitable lenses 62 to a detector 36' such as that illustrated in FIG. 7 at 36. The output from the detector is then supplied to suitable processing and display equipment, generally indicated at 64, which equipment may control motion of the disk with respect to the read/write beams for selection of pixels.

In the case of three-dimensional memories such as memory 50 illustrated in FIG. 11, second harmonic photons generated by color-changed molecules 54 can be absorbed by other molecules in the memory. For nondestructive reading in 3-D memories, then, it becomes necessary to select a reading laser wavelength wherein neither the fundamental nor the second harmonic photon is absorbed by a BR molecule. A suitable reading beam wavelength would be 1.70 μm, in which case the predicted contrast ratio of BR to M harmonic signals would be 40.

Because both two-photon excitation and second harmonic generation depend quadratically on the intensity, reading and writing with 3-D resolution can be accomplished by this nonlinear process with either a focused beam or the overlap of two beams. The response of materials to the nonlinear reading and writing beam is confined to the focal plane or the overlap region. Furthermore, reading with second harmonic (SH) generation is nondestructive and does not have the problem of crosstalk if we choose a reading laser beam with the wavelength of the fundamental and second harmonic photon outside the absorption band of the molecule. This has a significant advantage over two-photon fluorescence methods, because the overlap of the fluorescence band with the absorption band will cause crosstalk. The predicted contrast of the SH signal from BR and M states using a laser beam with wavelength 1.6 μm is larger than 40. As noted above, at this wavelength, both the fundamental and SH photon of the reading beam is not absorbed by BR. Therefore, crosstalk is eliminated.

The BR based 3-D optical storage system discussed above is only one of the many possible Architectures. Other forms of BR polymer matrix such as a BR cube oriented in various polymer matrices by electrical fields can also be used in a 3-D optical storage system. Since a second harmonic beam has a well-defined beam direction, reading with an SH signal can take advantage of the parallelism inherent in the optical system. For example, an array of laser diodes can be used to access an array of data simultaneously.

Although the disk 50 is shown as being solid, for convenience of illustration, it should be understood that it can also be formed of a stack of thin film 2-D membranes to produce multiple layers in which data can be stored and accessed, with the data storage capacity being equal to the data density of a 2-D membrane multiplied by the number of membranes (or planes) in the 3-D stack.

Although the second harmonic signal response is dependent on the square of the molecular density of the film, the contrast ratio of the SH signal from BR and from M is independent of the molecular density. As a result, the second harmonic read out offers a significant advantage over the absorptive read out method where the maximum contrast ratio is determined by the optical density of the film. For a given optical density of A, which is proportional to the molecular density of the film, a contrast ratio of $R=10^4$ occurs for absorptive read out. However, optical density is limited by certain constraints on the film thickness and the solubility of the BR in polymer. Thus, for example, the maximum thickness of the film in which information can be stored is limited by the diffraction of the read or write optical beam as it enters the material, and this limits the maximum density of stored information. For a bit size of 1 $\mu m^2$, the film thickness should be less than 3 $\mu m$ for a Gaussian optical beam. Even in a BR film without polymer, the optical density of such a film will be less than 0.8. The contrast ratio for such a film is less than 6.3 for absorptive read out, which is much smaller than the value which is available with second harmonic readout. Accordingly, the second harmonic readout has the advantage of a much higher contrast ratio than that of the absorptive readout technique, in addition to its advantage of being nondestructive.

To determine the power that would be needed to nondestructively read an image at the wavelength of maximum contrast discussed above, for a BR-PVA film with a thickness much less than the coherence length of the film, the number of second harmonic protons generated by an impinging light beam is given by the following equation:

$$N(2\omega) \approx \frac{16\pi^3 \omega}{hc^3} \bigg|_{N2\alpha(2)} \frac{P^2(\omega)}{S}$$

where $P(\omega)$ is the fundamental pump laser power, S is the area of the pump beam on the sample surface, $\alpha^{(2)}$ is the second order polarizability of the BR molecule, and $N_s + Nd = A/\sigma$, is the surface density of the BR molecule where N is the molecular density and d is the thickness of the sample, A is the O.D. of the BR-PVA and $\sigma$ is the absorption cross section of BR. The molecular polarizability $\alpha^{(2)}$ of the BR molecule has been determined for an exciting wavelength of 1.06 $\mu m$, and this near resonance data is used to determine $\alpha^{(2)}$ for an exciting wavelength of 1.14 $\mu m$ where its SH photon is in resonance. The value for $\alpha^{(2)}$ in resonance is $5.6 \times 10^{27}$ esu. for a BR-PVA film with an optical density of 0.2, and $2.5 \times 10^9$ SH photons/sec will be generated when 20 mW of 1.14 $\mu m$ cw laser is focused to 1 $\mu m^2$. A microchannel photomultiplier, which is sensitive to as few as 100 photons, will allow a detectable signal to be accumulated in less than 50 nsec. Thus a cw semiconductor laser is readily used in reading the optical memory without destruction.

Another important consideration is the power and time required to switch between the BR and M states. It is important to note that the quantum yields and absorption cross sections associated with these transitions are among the highest found in biological pigments and photochromic materials. Thus, a low energy density is required for level switching.

Figure 12:
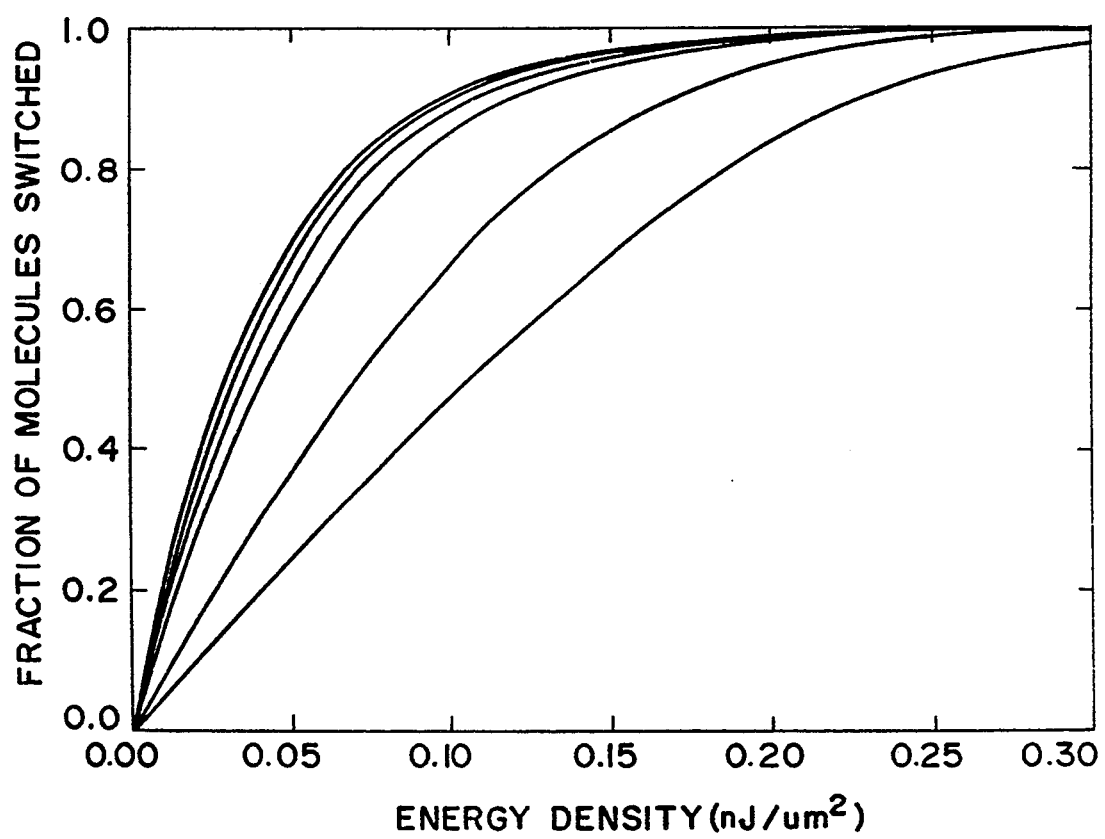
FIG. 12 is a graphical illustration of the fraction of molecules switched from the M state to the BR state as a function of the energy density for BR-PVA films with different optical densities.

As previously described with respect to FIG. 1, the M to BR phototransition has a switching time of 200 nsecs and there is no overlap in the absorption spectra between M and other photointermediate states. For monochromatic illumination of a BR-PVA sample with optical density A and thickness d, the fraction of molecules switched from the M to the BR state can be calculated analytically and is given by $$F = 1 - \frac{1}{A} \ln\{1 + [(\exp(A) - 1)]\exp(-\sigma\phi I_o t)\} \quad \text{(Eq. 3)}$$

where $A = \sigma n_o d$ is the optical density of the film, $\sigma$ is the absorption cross section of the M state, $n_o$ is the concentration of BR molecules, $I_0$ is the light intensity in units of photon flux, and $\phi = 0.7$ is the quantum yield for the back photoreaction of the M state. In FIG. 12, the fraction of molecules switched from M to BR by a 410 nm beam ($\sigma = 1.6 \times 10^{16}$ cm$^2$) is plotted as a function of energy density for films of BR-PVA with different optical densities. For a bit size of 1 $\mu$m$^2$ and optical density of 0.2, the required switching energy is about 0.2 nJ. Thus, for a 5 bit/sec. data rate, only a 2 nw cw laser at 410 nm is required. However, for BR to M switching, the problem is complicated by the fact that, unlike the back photoreaction from M to BR, the forward reaction occurs through a series of intermediates with absorptions that overlap with BR. This overlap limits the switching time of BR to M since quasi photostationary equilibria will be generated that delay the rapid switching of Br to M. Using a BR photocycle model in which the back photoreaction of the K state is included, the predicted minimum time to initiate BR to M switching is about 20 $\mu$s. Thus, for high bit rate applications, the BR to K state transition is most promising. However, the high overlap in the absorption and low temperature (90° K.) required to stabilize this intermediate could cause a possible contrast problem that could be alleviated by second harmonic readout.

In another form of the invention, a light-to-electrical signal transducer (or detector) is provided, which consists of a thin dry layer of oriented photoactive molecules such as bacteriorhodopsin embedded in the purple membrane, as discussed above. As discussed with respect to FIG. 6, exposure of the molecule to light, which initiates the photocycle consisting of a number of thermally produced intermediates, also results in electrical charge transport across the molecule. In accordance with this aspect of the invention, BR molecules embedded in the purple membrane are oriented in such a way that the vectorial transport of electrical charge has a component predominantly in the direction perpendicular to the layer surface. When such a thin dry layer is exposed to light, a photo-induced electrical signal can be measured across the layer. By introducing local heterogeneities into this detector, the direction of the photo-induced electrical charge transport can be affected.

Figure 13:
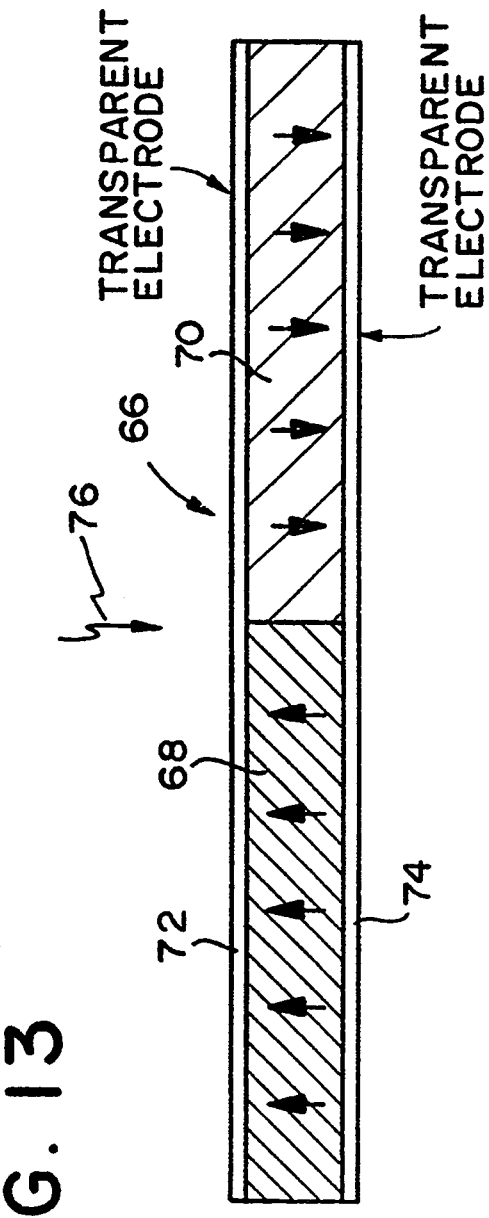
FIG. 13 is a cross-sectional diagrammatic view of a BR detector having two regions of oppositely oriented molecules.

One embodiment of this aspect of the present invention provides a detector 66 (FIG. 13) consisting of various regions in which molecules are oriented in opposite directions. For example, the detector 66 may consist of two regions 68 and 70 in which the molecules in region 68 are oriented in one direction and those in region 70 are oriented in the opposite direction. Transparent electrodes 72 and 74 sandwich both these regions. Upon illumination of regions 68 and 70 with light 76 at a wavelength corresponding to the visible absorption spectrum of the molecules, both regions generate electrical signals, with the polarity in region 68 being opposite to that in region 70. The overall electrical signal across the detector 66 is the difference in amplitude between the signals from regions 68 and 70. The amount of signal from each region can be modified by the surface area of the region, the wavelength of illumination, the concentration of photoactive molecules within the region or the degree of molecular orientation or any combination of these characteristics. The detector 66 can, therefore, perform a weighted subtraction operation at the detector level by making use of the directionality of a photoinduced signal and its association with the molecule orientation.

Figure 14:
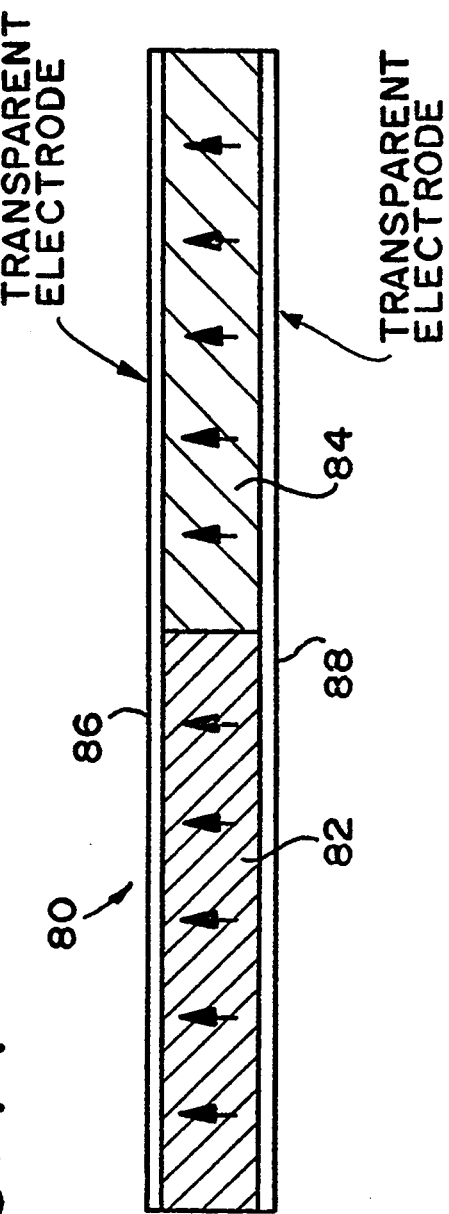
FIG. 14 is a cross-sectional diagrammatic view of a BR detector having two regions of different molecular compositions.

Another embodiment of the detector of the present invention is illustrated in FIG. 14, wherein a detector 80 consists of distinct regions 82 and 84 in which different combinations of intermediates produced by light exist in varying ratios. Most intermediates in the BR photocycle can be stabilized in a number of ways, such as by low temperature, alkaline treatment, dehydration, or chemical as well as site directed mutagenic modifications. Intermediates have distinct absorption spectra, and they are photoactive. Illumination of these intermediates at wavelengths corresponding to their absorption spectra drives them back to the initial pigment state, the so-called backphotoreaction. The polarity of a photoinduced signal during a backphotoreaction is opposite from that observed during the corresponding forward photoreaction. Thus, detector 80 makes use of the dependence of the polarity of the electrical signal on the composition of molecules present in the detector and the illumination wavelength.

Molecules in region 82 are, for example, in the initial pigment state whereas those in region 84 are in another intermediate state. The polarity of the signal induced by a photoreaction in region 82 is opposite from that induced by its corresponding backphotoreaction in region 84. The net electrical signal is thus the difference in amplitude between electrical signals from regions 82 and 84 as measured across electrodes 86 and 88. The weight of a signal from each region can be modified by the surface area of the region, the composition of photoactive molecules within the region, and the wavelength of illumination. This aspect of the invention undertakes fundamentally the same task as that of FIG. 13, but it has an added advantage that heterogeneities in the detector are implemented by light.

Another aspect of the present invention provides a detector with a built-in memory. This detector is constructed in the same manner as detector 70 in FIG. 14, but its purpose is different. The electrical response in this implementation depends on the composition of photoactive molecules present. If each intermediate is designated to represent a different memory content, then the electrical response will depend on the memory content. For example, an image can be projected on the detector 70 and optically stored in the detector as regions of differing compositions of various intermediates. When another image is subsequently projected on the detector, the overall electrical response of the detector depends on the memory content and the projected image; that is, the relation between the first and second images. This implementation differs from other schemes proposing use of bacteriorhodopsin as a photochromic material for optical memory in the sense that this implementation is based on the dependence of the polarity of the photo-induced signals on the composition of molecules in a thin dry layer of oriented molecules.

In another embodiment of the invention, an oriented BR-PVA film can be further impregnated with a solution having a higher pH than was used to produce orientation after an image has been formed in the film. Such high pH impregnation fixes the image permanently in the film. Additionally, it will be seen that thin films having heterogeneities as discussed above may be used to modulate a light beam passing through the film by optically or electrically varying the transparency of the film selectively.

Figure 15A:
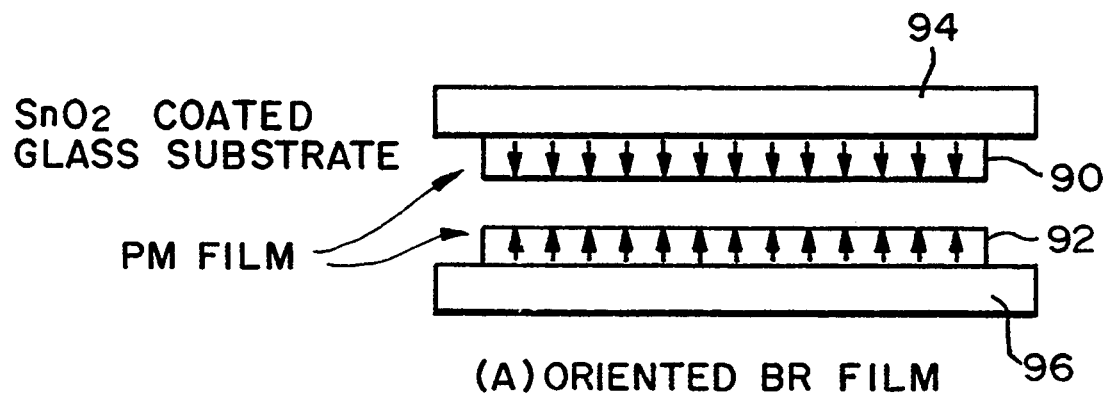
FIGS. 15A, 15B and 15C provide a diagrammatic illustration of a method of constructing a BR photodetector capable of simulating the receptive fields of a biological visual system.
Figure 15B:
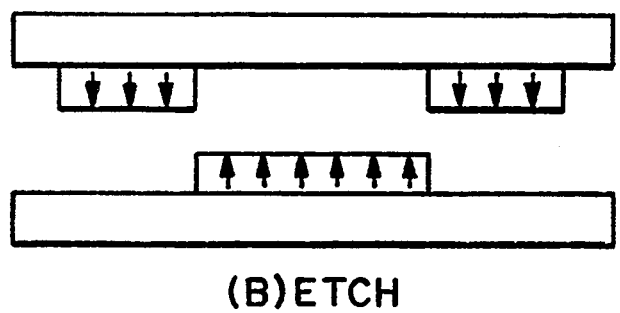
Figure 15C:
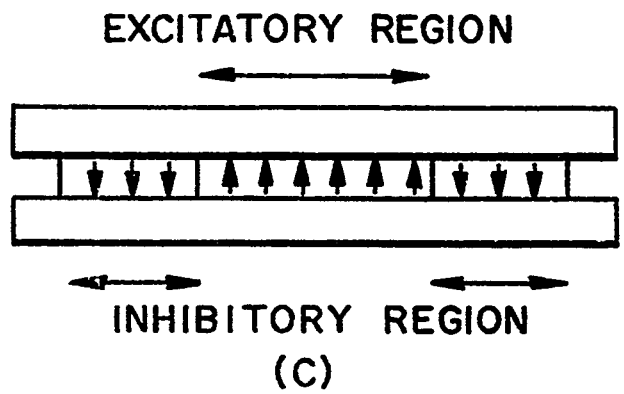

FIGS. 15A–15C illustrate the construction of a BR photodetector capable of simulating receptive fields of a biological visual retina system. The purple membrane 90, 92 is first oriented on a glass substrate 96 having transparent ITO electrodes by electrophoresis methods. Excitatory and inhibitory regions are then patterned on the two separate films 90 and 92 (FIG. 15B) and appropriate sections are removed from each film by laser ablation. These two films are then oriented face to face and brought into contact (FIG. 15C). The molecules in the center region are thereby oriented in the opposite direction to the molecules in the surrounding region, as illustrated. The photovoltage from the BR in center is positive and represents an excitatory response, while photovoltage from the purple membrane in the surrounding region is opposite in polarity and represents an inhibitory response.

In summary, the present invention is directed to the production of oriented BR films with high optical quality in which data can be written and erased over at least $10^6$ cycles. Using the nonlinear optical characteristics of these films, such images can be read nondestructively using SH microscopy. Furthermore, such BR-PVA films can be used as an erasable optical storage medium and can be used to perform arithmetic operations. Advances in genetic and synthetic techniques as applied to BR should improve this unique system for information processing and storage.

What is claimed is:

1. A method of producing a stable reversible, high resolution image on a bacteriorhodopsin (BR)-containing film, comprising:
    dissolving polyvinyl alcohol PVA in a buffer to form a PVA solution;
    dissolving a BR material which is optically switchable between first and second states in a buffer to form a BR solution;
    adjusting the pH of said BR solution to produce a high pH BR solution;
    mixing said PVA and high pH BR solutions to form a BR-PVA solution;
    forming a film of said BR-PVA solution;
    drying said film;
    directing light of a first spectral range to selected locations in said film to expose selected BR molecules in said film to an optical image to switch the selected BR molecules from their first to their second state and thereby to switch the color of said exposed BR molecules to provide a corresponding image; and
    directing light of a second spectral range to illuminate selected locations in said film to cause previously exposed BR molecules to emit light at a second harmonic of the illuminating light in said second spectral range to thereby nondestructively detect said image.

2. The method of claim 1, further including impregnating said exposed film with a high pH solution to fix said optical image in said film.

3. The method of claim 1, further including forming and drying plural layers of said film to form a three dimensional structure and exposing selected locations and selected layers in said structure to produce a three-dimensional data image.

4. The method of claim 3, wherein the step of directing light of a first spectral range includes directing light to selected locations in selected layers to switch the state of BR molecules so exposed to produce a three-dimensional image.

5. The method of claim 4, wherein the step of directing light of a second spectral range includes directing light to illuminate selected locations in selected layers to cause previously exposed BR molecules to emit light at a second harmonic of the illuminating light in said second spectral range to thereby nondestructively detect said three-dimensional image.

6. The method of claim 4, wherein the step of directing light of said first spectral range includes focusing a beam of light onto a selected location in a selected layer to produce light of sufficient intensity to produce two-photon excitation of exposed BR molecules.

7. A method of producing an oriented bacteriorhodopsin (BR)-polyvinyl alcohol (PVA) film capable of receiving a stable image for optical information storage, comprising:
    dissolving in a buffer a BR material capable of responding to light of a first spectral range of light energy to change its structure to an intermediate state which is capable of responding to a second spectral range of light energy to change back to said BR material, to thereby form a BR solution;
    dissolving in a buffer a PVA material to thereby form a PVA solution;
    mixing said BR solution and said PVA solution to produce a BR-PVA solution;
    spreading a volume of the BR-PVA solution on a substrate to form a BR-PVA film from said BR-PVA solution;
    diffusing a high pH buffer into said film before completely drying to control the orientation of said BR material in said film and to increase the stability of said BR intermediate state: and
    drying said film to a thickness of about 150 to 200 microns with an optical density of about 0.15, with the film having an absorption spectrum substantially the same as that of said BR material in said solution.

8. The method of claim 7, further including forming and drying plural layers of said film on said substrate to form an oriented film capable of receiving a three-dimensional image.

9. The method of claim 7, further including imaging said dried film with light of said first spectral range to shift selected molecules of said BR material to said intermediate state to produce in said dried film an optical image, said image having a color corresponding to said first spectral range.

10. The method of claim 9, further including directing light of a third spectral range onto said optical image on said film to nondestructively illuminate said image.

11. The method of claim 10, further including directing light of said first spectral range onto said film to convert remaining BR molecules of said BR material to said intermediate state to erase said image.

12. The method of claim 11, further including producing a new image on said film by imaging said film with light of said second spectral range to shift selected imaged intermediate state molecules to their BR state, said new image having a color corresponding to said second spectral range.

13. The method of claim 12, further including directing light of a fourth spectral range onto said new image on said film to nondestructively illuminate said new image.

14. The method of claim 12, further including directing light of said second spectral range onto said film to convert remaining intermediate state molecules to their BR state to erase said new image by either 1-photon or 2-photon absorption.

15. The method of claim 9, further including directing light having a frequency out of the absorption range of said BR material but having a second harmonic frequency near the absorption range of said BR material, onto said film to read said image nondestructively.

16. The method of claim 9, further including detecting said dried film image by measuring electrical signals produced by said BR material and by said intermediate material.

17. The method of claim 7, wherein the step of diffusing a high pH buffer includes adjusting the pH of the buffer to 10.

18. The method of claim 1, further including exposing the entire surface of said film to light of said first spectral range to switch the state of all previously unexposed BR molecules to their second state to erase said image.

19. The method of claim 18, further including directing light of a third spectral range to illuminate selected locations in said film to expose selected BR molecules to shift them from their second state back to their first state to provide a corresponding reversed-color image.

20. The method of claim 19, further including directing light of said third spectral range to expose the entire surface of said film to return all BR molecules to their first state to erase said reversed-color image.

21. The method of claim 18, further including directing light of a third spectral range to expose the entire surface of said film to return said BR molecules to their first state.

22. The method of claim 1, wherein the step of directing light of a second spectral range includes directing light having a wavelength outside the absorption spectrum of BR molecules in their second state but having a second harmonic wavelength within said absorption spectrum to nondestructively detect said image.

23. A method of producing an oriented bacteriorhodopsin (BR)-polyvinyl alcohol (PVA) film capable of receiving a stable image for optical information storage, comprising:

dissolving in a buffer a BR material capable of responding to light of a first spectral range of light energy to change its structure to an intermediate material which is capable of responding to a second spectral range of light energy to change back to said BR material, to thereby form a BR solution;

dissolving in a buffer a PVA material to thereby form a PVA solution;

mixing said BR solution and said PVA solution to produce a BR-PVA solution;

spreading a volume of the BR-PVA solution on a substrate to form a BR-PVA film from said BR-PVA solution; and diffusing a high pH buffer into said film before completely drying to control the orientation of said BR material in said film and to increase the stability of said BR intermediate state; and drying said film to a thickness to produce an optical density of about 0.15, with the film having an absorption spectrum substantially the same as that of said BR material in solution.

24. The method of claim 23, further including degassing said BR-PVA solution.

25. The method of claim 23, further including cleaning a glass substrate and thereafter spreading said BR-PVA solution on the glass substrate.

26. The method of claim 23, further including drying said BR-PVA film with a uniform flow of filtered air.

27. The method of claim 23, wherein the step of drying includes uniformly drying the film to produce a film thickness of about 150–200 microns.

* * * * *

UNITED STATES PATENT AND TRADEMARK OFFICE
CERTIFICATE OF CORRECTION

PATENT NO. : 5,346,789

DATED : September 13, 1994

INVENTOR(S) : LEWIS et al.

It is certified that error appears in the above-identified patent and that said Letters Patent is hereby corrected as shown below:

Column 17, claim 3, line 68, please cancel "data".

Signed and Sealed this

Twenty-second Day of November, 1994

Attest:

BRUCE LEHMAN

*Attesting Officer*   *Commissioner of Patents and Trademarks*